United States Patent
Miura et al.

(10) Patent No.: US 8,539,244 B2
(45) Date of Patent: Sep. 17, 2013

(54) SERVER, AUTHENTICATION SERVER, CONTENT DELIVERY SYSTEM, AND PROGRAM

(75) Inventors: Shuhei Miura, Tokyo (JP); Akira Kobayashi, Tokyo (JP); Katsuhiro Ochiai, Tokyo (JP); Kaori Sugiyama, Tokyo (JP); Koichi Nihei, Tokyo (JP); Kaname Naito, Tokyo (JP); Motonobu Kimura, Tokyo (JP); Junichi Gokurakuji, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 12/739,778

(22) PCT Filed: Oct. 15, 2008

(86) PCT No.: PCT/JP2008/069076
§ 371 (c)(1),
(2), (4) Date: Apr. 26, 2010

(87) PCT Pub. No.: WO2009/057485
PCT Pub. Date: May 7, 2009

(65) Prior Publication Data
US 2010/0251333 A1   Sep. 30, 2010

(30) Foreign Application Priority Data
Oct. 29, 2007  (JP) ................ 2007-280265

(51) Int. Cl.
*H04L 29/06* (2006.01)
*H04L 9/32* (2006.01)
*G06F 21/00* (2013.01)
*G06F 7/04* (2006.01)

(52) U.S. Cl.
USPC .......... 713/182; 713/150; 713/155; 713/161; 713/165; 713/169; 726/2; 726/17; 726/27

(58) Field of Classification Search
USPC ................ 726/3, 2, 17, 27; 713/150, 155, 713/161, 165, 169, 182
See application file for complete search history.

(56) References Cited

U.S. PATENT DOCUMENTS

| | | | |
|---|---|---|---|
| 6,510,236 B1 * | 1/2003 | Crane et al. ................ | 382/116 |
| 2002/0129262 A1 * | 9/2002 | Kutaragi et al. .......... | 713/193 |
| 2009/0165096 A1 * | 6/2009 | Hughes et al. .................. | 726/5 |

FOREIGN PATENT DOCUMENTS

| | | |
|---|---|---|
| JP | 2000090273 A | 3/2000 |
| JP | 2002073561 A | 3/2002 |
| JP | 2003067526 A | 3/2003 |
| JP | 2003-174636 A | 6/2003 |
| JP | 2004187230 A | 7/2004 |
| JP | 2004235105 A | 8/2004 |
| JP | 2005050186 A | 2/2005 |
| JP | 2005-175862 A | 6/2005 |
| JP | 2005222189 A | 8/2005 |

(Continued)

OTHER PUBLICATIONS

International Search Report for PCT/JP2008/069076 mailed Jan. 13, 2009.
Japanese Office Action for JP Application No. 2009-539021 mailed on Jul. 10, 2013 with English Translation.

*Primary Examiner* — Mohammad W Reza

(57) ABSTRACT

A service provider server has management means which manages a user ID corresponding to a service user and a device IDs corresponding to an information processing terminals of the service user in association with each other.

19 Claims, 13 Drawing Sheets

(56) References Cited

FOREIGN PATENT DOCUMENTS

| | | |
|---|---|---|
| JP | 2005-244948 A | 9/2005 |
| JP | 2006202196 A | 8/2006 |
| JP | 2006309326 A | 11/2006 |
| JP | 2007115023 A | 5/2007 |
| JP | 2007194765 A | 8/2007 |
| WO | 2005006203 A | 1/2005 |

* cited by examiner

| MASTER ID | NUMBER OF SLAVE IDS | SLAVE ID |
|---|---|---|
| username**** | 5 | mail0093@xxxx.xx.com |
| | | mail0322@xxxx.xx.com |
| | | 192.168.XXX.XXX |
| | | 1.XXX.YYYY.co.jp |
| | | 2.XXX.YYYY.co.jp |
| userno2****** | 1 | AS12115455435430 |
| taro.yamada | 4 | Y5412543543 |
| | | 00-0D-56-93-XX-XX |
| | | 00-0D-56-93-XY-ZZ |
| | | 3ae3:90a0:bd45:01 45:0744:1fc0:4841:0ae |
| user001@converter.com | 3 | phone*****@aaa.ne.jp |
| | | st******@bbb.com |
| | | pc*********@bbb.com |
| exam001@converter.com | 2 | phone*******@aaa.ne.jp |
| | | pda*********@ddd.com |
| . | . | . |
| . | . | . |
| . | . | . |

MASTER ID: USERNAME****
- AUTHENTICATION CLASS
  - CLASS A
- PERSONAL INFORMATION
  - BIRTH DATE: 19XX, YY, DD
  - TELEPHONE NUMBER: XX-XXXX-XXXX
- SERVICE STATUS
  - MUSIC DOWNLOAD SERVICE: OFF
  - VIDEO STREAMING SERVICE: ON
  - VIDEO DOWNLOAD SERVICE: OFF
- VIEWING/LISTENING STATUS
  - CONTENT B: 00:34:21 BEING PLAYED
  - AUTHENTICATION CLASS A: OO MINUTES AFTER AUTHENTICATION
- HISTORY
  - CONTENT A: 00:32:23 STOPPED YYYY/MM/DD HH:MM
  - CONTENT C: NOT PLAYED YYYY/MM/DD HH:MM
  - CONTENTS X: 00:10:23 STOPPED YYYY/MM/DD HH:MM
- AUTHENTICATION DEVICE
  - PC
    - RESOLUTION 800 × 600
    - SEAMLESS ○
  - HI-DEFINITION TV
    - RESOLUTION 1080i
    - SEAMLESS ○
  - PDA
    - RESOLUTION 640 × 480
    - SEAMLESS ○
  - CELLULAR PHONE
    - RESOLUTION 320 × 240
    - SEAMLESS ×
- LICENSE INFORMATION
  - ○○ PURCHASED
  - ○□ PURCHASED
  - ○△ TRIAL PURCHASED
- BILLING INFORMATION
  - CARD NO: XXXXXXXXXXXXXXXX
- USING ISP
  - BIG ○○○
  - MOBILE NETWORK CORPORATION
- DELIVERY SERVER
  - 183.154.461.XXX
- CM VIEWING/LISTENING HISTORY
  - CM A: ○ TIMES
  - CM B: ○ TIMES
  - CM C: ○ TIMES
  - CM D: ○ TIMES
- PREFERENCE INFORMATION
  - FOREIGN FILMS
  - JAPANESE FILMS
  - ANIMATIONS
  - JAPANESE MUSIC
  - FOREIGN MUSIC
  - CLASSICAL MUSIC

FIG. 5

SERVER, AUTHENTICATION SERVER, CONTENT DELIVERY SYSTEM, AND PROGRAM

TECHNICAL FIELD

The present invention relates to a management server that manages IDs, an authentication server, a content delivery system, and a program.

BACKGROUND ART

In these days, there are systems for delivering contents such as music, video, and images via a network such as the Internet or a cable television.

Methods of delivering contents are roughly classified into a streaming scheme and a downloading scheme. In the streaming scheme, data provided via a network from a content provider server are played back on a user terminal on real time and can be displayed on a display unit or the like. In the downloading scheme, data corresponding to a file are downloaded into a storage unit from a content provider server via a network. The data are played back at any desired timing and can be displayed on a display unit or the like.

For the copyright and/or proper use of the contents, limitations and the like are often imposed on recording of streaming data or moving downloaded data to another information processing terminal.

Examples of the related art include Patent Document 1. Patent Document 1 discloses a content billing system in which a content delivery server, a license management server for information terminals (management server), and a plurality of information processing terminals (user terminals) are connected to each other via a network, the content delivery server has a billing means, and the license management server for information terminals has a license billing means for terminals and a means for changing the copyright management system.

In the aforementioned content billing system, when a user moves (transfers) contents (content data) purchased on a specific information processing terminal to another information processing terminal, proper copyright management and an associated process such as billing are performed through access to the means for changing the copyright management system and the license management server.

Patent Document 1: Japanese laid-open patent publication No. 2006-309326

DISCLOSURE OF INVENTION

Problem(s) to be Solved by the Invention

In this field, which includes the content delivery system disclosed in Patent Document 1, there has been desired a seamless service with regard to use of contents between information processing terminals used by a user. Furthermore, continuous improvement of the usability has been desired.

Thus, one of problems is further improvement of the usability along with proper use of contents. As a specific example, a problem is to take over of content being played back between information processing terminals used by a user, to simplify a take over process, and to convert the contents into a format suitable for each information processing terminal.

In view of the above problems, an object of the present invention is to provide a server system for performing an authentication with improved usability.

Another object of the present invention is to provide a content delivery system with improved usability.

Still another object of the present invention is to provide an ID management server and an authentication server for providing a content delivery system with improved usability.

Still another object of the present invention is to provide an authentication method and a content delivery method with improved usability.

Means to Solve the Problem(s)

A server according to the present invention is characterized by having management means for managing a user ID corresponding to a service user and a device ID corresponding to an information processing terminal of the service user in association with each other.

Effect(s) of the Invention

According to the present invention, a server system can be provided with improved usability.

Furthermore, according to the present invention, an ID management server and an authentication server for providing a content delivery system with improved usability can be provided.

Moreover, according to the present invention, an authentication method and a content delivery method can be provided with improved usability.

BRIEF DESCRIPTION OF DRAWINGS

FIG. 4 is an explanatory diagram visibly illustrating ID management information recorded in the authentication server.

FIG. 5 is an explanatory diagram visibly illustrating individual information recorded in association with each master ID recorded in master ID information.

BEST MODE FOR CARRYING OUT THE INVENTION

A first embodiment of the present invention will be described with reference to FIGS. 1 to 7. A content delivery service is described by way of example. The present invention is applicable to services other than a content delivery service. The present invention is applicable to any system as long as a user of a service uses a plurality of information processing terminals for enjoying the service.

Figure 1:
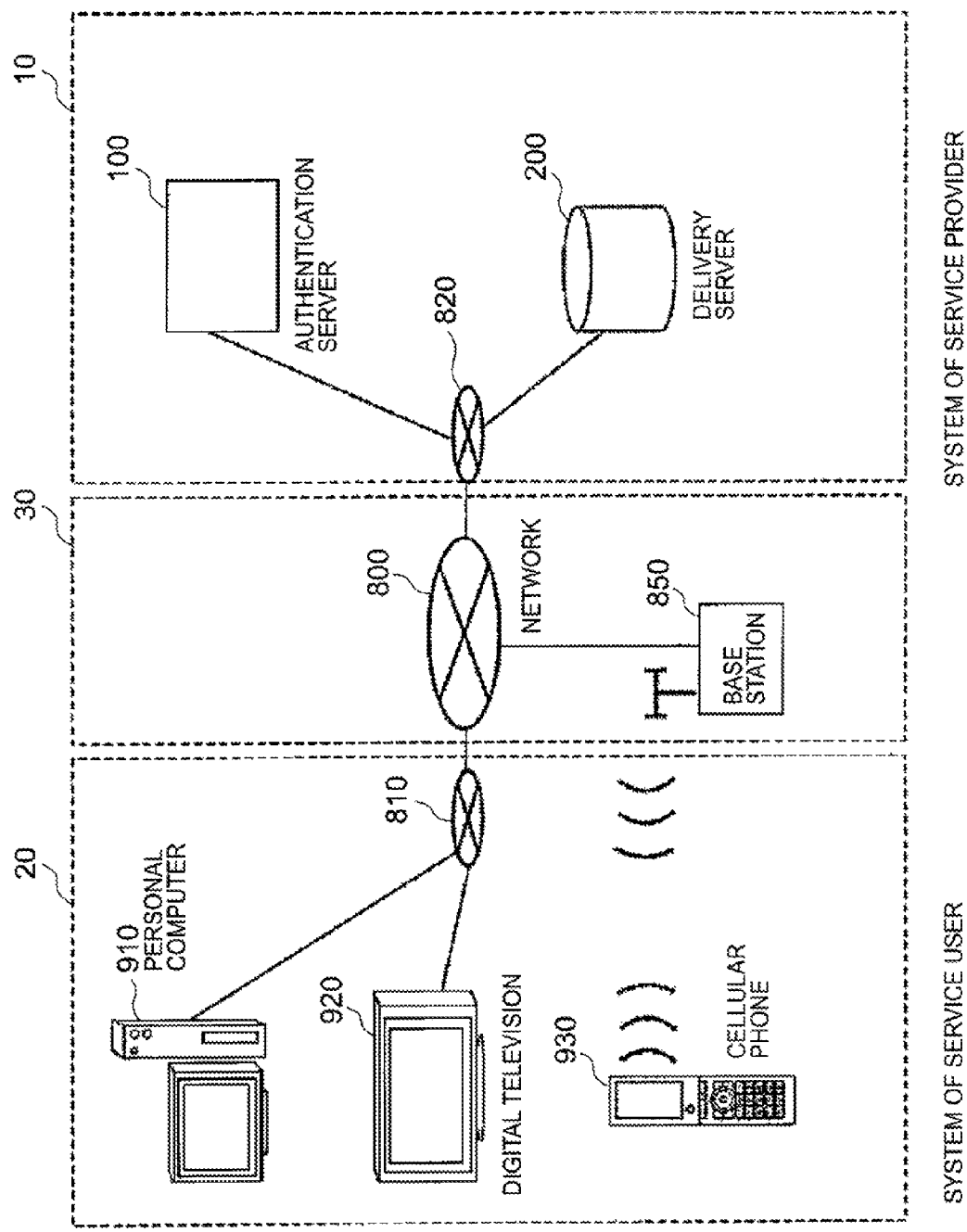
FIG. 1 is a diagram schematically showing a configuration example of a content delivery service according to a first embodiment.

FIG. 1 is a diagram schematically showing a configuration example of a content delivery service according to the first embodiment. The content delivery service can roughly be divided into a system of a service provider 10, a system of a service user 20, and a network 30 for connecting those systems to each other.

The system of the service provider 10 includes an authentication server 100 operable to perform an authentication process for a content delivery system, a delivery server 200 operable to store various types of contents (content data) and deliver them on demand from the authentication server 100, and a network 820. In this embodiment, the content delivery system is separated into the authentication server 100 and the delivery server 200. However, this arrangement is for the sake of brevity. One server may perform both of an authentication process and a delivery process. Alternatively, another server such as a content database server may additionally be provided.

Examples of the system of the service user 20 include fixed information processing terminals such as a personal computer 910, a digital television 920, and a set-top box (not shown), and mobile information processing terminals such as a cellular phone 930, a PHS (not shown), a PDA (not shown), a smart phone (not shown), and a mobile IP phone (not shown). Furthermore, the system of the service user 20 includes a router or a modem constituting the network 810, a network HDD, and the like. Each of those information processing terminals has a network connection part and a storage unit to enjoy the content delivery service and also has a playback means such as a browser or dedicated software.

The network 30 is operable to connect the system of the service provider 10 and the system of the service user 20 to each other and to transmit contents or various types of information. Typical configuration includes the Internet 800 and a cellular phone communication system 850. Furthermore, a PHS system, a cable television network, an IMS network, or an NGN network may be used.

Figure 2:
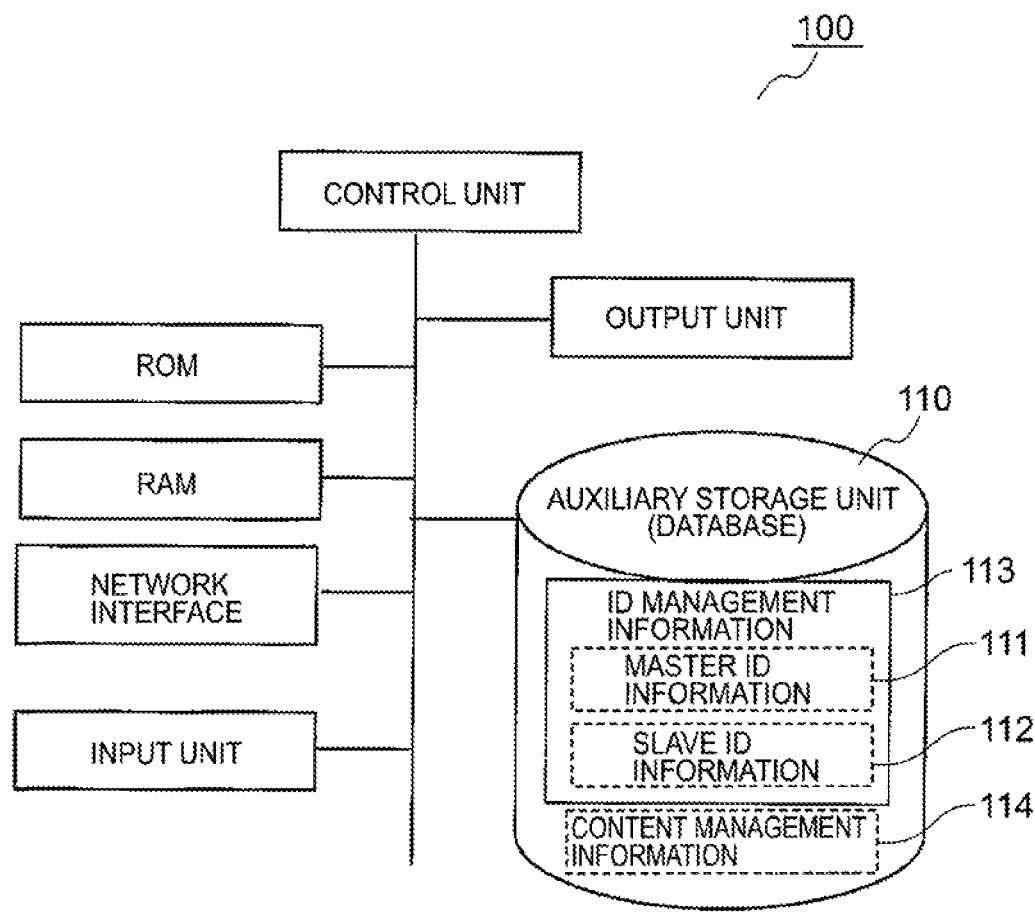
FIG. 2 is a block diagram showing a configuration of an authentication server.

FIG. 2 is a block diagram showing a configuration of the authentication server 100. The authentication server 100 of the present embodiment has the same configuration as a general server. Specifically, the authentication server 100 includes a control unit operable to perform various types of information processing and calculations, a memory such as a ROM and a RAM (storage media), an input unit, an output unit, a network interface part, an auxiliary storage unit 110, and the like. Furthermore, software stored in the auxiliary storage unit 110, the ROM, or the RAM allows the control unit to function as a variety of means.

As the aforementioned software, an OS (Operating System) and software for the server to implement a variety of means are recorded in the auxiliary storage unit 110. Additionally, master ID information 111, slave ID information 112, ID management information 113, and content management information 114 are also recorded in the auxiliary storage unit 110.

The master ID information 111 is information in which IDs (user IDs, user authentication IDs), each of which is assigned to each user of the content delivery service so that the user can uniquely be identified, are collectively recorded. Furthermore, individual information such as personal information (e.g., a birth date and gender) and information relating to the service is also recorded for each master ID.

The slave ID information 112 is information in which IDs (device IDs, device authentication IDs), each of which includes unique information (such as an IP address, a domain name, a URI (Uniform Resource Identifier), a MAC address, and/or a serial number) that can uniquely identify an information processing terminal used by the service user, are collectively recorded. Furthermore, individual information such as information relating to the service is also recorded for each slave ID.

Combinations of the master ID information 111 and the slave ID information 112 are managed as ID management information 113 and are used for authentication, identification of a service user and an information processing terminal, and improvement of the usability of the service.

The content management information 114 is used to generate additional information to be transmitted to the delivery server 200. Metadata such as types of contents stored in the delivery server 200, encoding formats, available DRM, and delivery targets are stored as the content management information 114 and are used to provide the service. The master ID information 111 and the like will be described later with reference to FIGS. 4 to 6.

Figure 3:
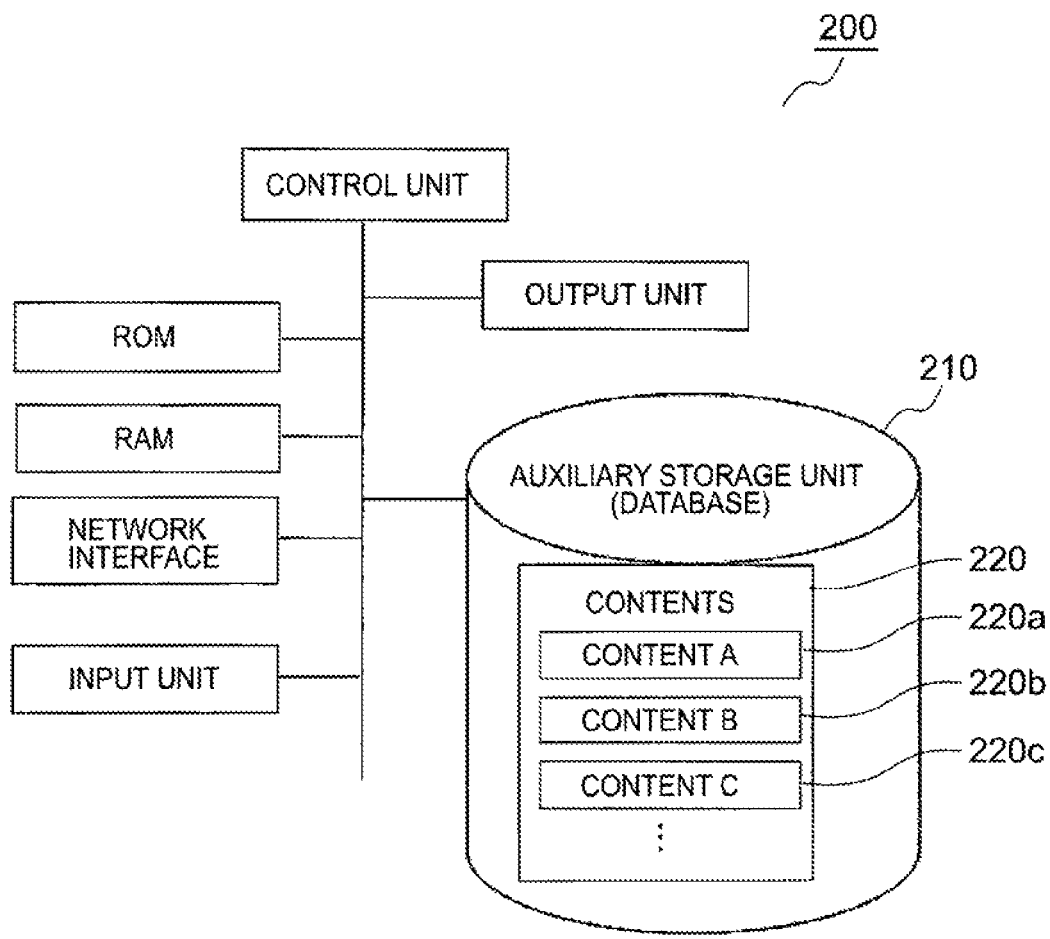
FIG. 3 is a block diagram showing a configuration of a delivery server.

FIG. 3 is a block diagram showing a configuration of the delivery server 200. As with the authentication server 100, the delivery server 200 has the same configuration as a general server. Specifically, the delivery server 200 includes a control unit operable to perform various types of information processing and calculations, a memory such as a ROM and a RAM (storage media), an input unit, an output unit, a network interface, an auxiliary storage unit 210, and the like. Furthermore, software stored in the auxiliary storage unit 210, the ROM, or the RAM allows the control unit to function as a variety of means.

As the aforementioned software, an OS (Operating System) and/or software for the server to implement a variety of means are recorded in the auxiliary storage unit 210. Additionally, contents 220, which is an aggregate of many content, is stored in the auxiliary storage unit 210.

The contents 220 includes various types of contents, such as video, music, and image. Contents to be delivered are not limited to those examples.

FIG. 4 is an explanatory diagram visibly illustrating the ID management information 113 recorded in the authentication server 100.

The ID management information 113 indicates association of the master IDs and the slave IDs. For example, five slave IDs of "mail0093@xxxx.xx.com," "mail00322@xxxx.xx.com," "192.168.XXX.XXX," "1.XXX.YYYY.co.jp," and "2.XXX.YYYY.co.jp" are associated with the master ID of "username****" and are collectively managed. Users may register the association for the content delivery system, or other methods may be used.

The master IDs for the users, which are listed in the master ID column 401, employ IDs arbitrarily assigned by the service provider, IDs determined by the users, or the like. Furthermore, in a case where the service is developed over a plurality of service providers, the master ID may employ ID including a user name and a domain name.

The slave IDs, which are listed in the slave ID column 402, include information that can uniquely identify an information processing terminal used by a service user and may employ an IP address, a domain name, a URI, a MAC address, a serial number, combinations thereof, or the like. Alternatively, the slave IDs may employ IDs arbitrarily assigned by the service provider or IDs determined by the users.

FIG. 5 is an explanatory diagram visibly illustrating individual information recorded in association with each master ID recorded in the master ID information 111. In FIG. 5, various kinds of individual information such as personal information are listed in association with the master ID of "username****." The illustrated individual information includes the authentication class, the personal information, the viewing/listening status, the history, and the like. Those kinds of information can be recorded in any format and can be configured so as to conform to the service to be provided.

The authentication class is a class defined for each subscription service accessible by the user. For example, the authentication class is defined by age, gender, monthly usage, using status, and the like. The information of the authentication class is used when viewing/listening limitations are imposed on various types of contents and/or when a value-added service is provided. In other words, the information of the authentication class is used for the service provider to select service users.

The information of the service status indicates the status of the service for which the service user made a contract.

The information of the viewing/listening status indicates latest information on contents viewed or listened to by the service user and the authentication status. The example of FIG. 5 indicates that the content B are being played at 00:34:21. This information is used to deliver a playback position and the like between devices.

The information of the history indicates the status of contents purchased in the past and the status of the service enjoyed in the past. Furthermore, the information of the history indicates the stopped position of playback and the date of playback.

The information of the authentication device indicates device class information of the information processing terminal used by the service user. Available service and the like are recorded for each of devices such as a PC, a PDA, and a cellular phone. The authentication device class listed in the device column is associated with the slave ID.

The license information indicates information of services and/or contents purchased in the past, the expiration date thereof, and the like.

The billing information indicates information on billing such as a credit card or a payment account.

The information of the using ISP indicates network path information such as an ISP. Furthermore, the information of the using ISP indicates a path for each service.

The information of the delivery server indicates an IP address of the server that delivers contents and the like. The delivery server may be specified by any method other than an IP address as long as contents can be provided to service users.

The information of the CM viewing/listening history indicates information on billing or addition of points based upon viewing/listening CMs. Furthermore, information on a viewing/listening date may be recorded as needed.

The preference information indicates information registered by the user or information extracted from the user's past purchase history or the user's past search history. The preference information is used for delivery of advertisement or recommendation of contents.

Figure 6:
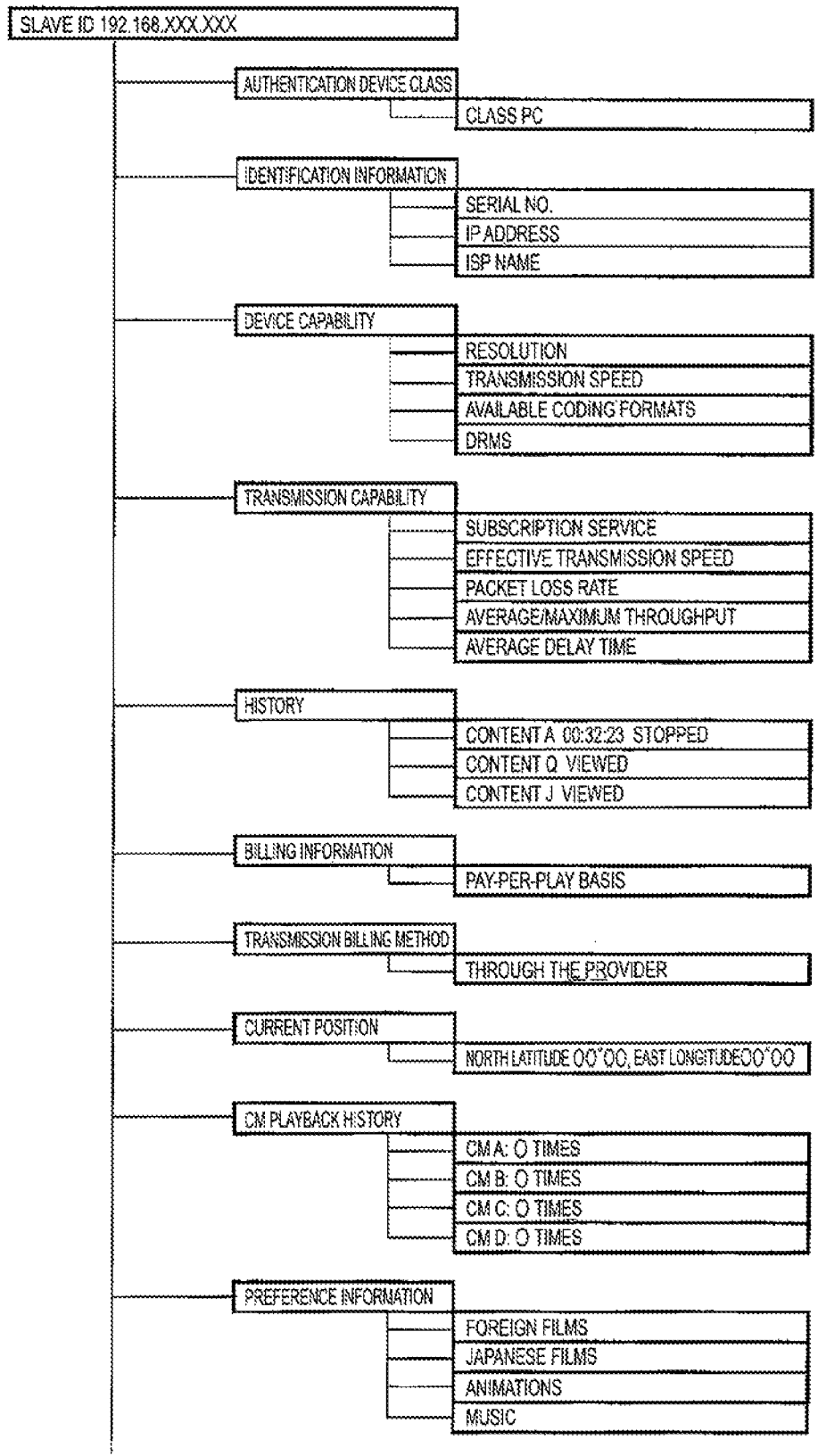
FIG. 6 is an explanatory diagram visibly illustrating individual information recorded in association with each slave ID recorded in slave ID information.

FIG. 6 is an explanatory diagram visibly illustrating individual information recorded in association with each slave ID recorded in the slave ID information 112. In FIG. 6, various kinds of individual information are listed in association with the slave ID of "192.168.XXX.XXX." The individual information includes the authentication device class, the identification information, the device capability, the history, and the like. Those kinds of information can be recorded in any format and can be configured so as to conform to the service to be provided.

The authentication device class indicates a class of an information processing terminal that is associated with the authentication device listed in the individual information of the master ID and is specified by the slave ID.

The identification information is an IP address, a domain name, a URL (Uniform Resource Locator), a MAC address, a serial number, or the like that can uniquely identify the information processing terminal.

The information of the device capability indicates information of a playback resolution, process performance, a transmission speed, available encoding formats, available DRMs of the information processing terminal specified by the slave ID and the like. The service user may set the information of the device capability, or the server may automatically acquire the information of the device capability.

The information of the transmission capability indicates the subscription service such as xDSL or FDDI, the effective transmission speed, the packet loss rate, and the like, which are defined by registration, measurement, or the like.

The information of the history indicates the history of the contents played on the information processing terminal specified by the slave ID.

The billing information indicates the payment method for the service, such as a pay-per-play basis, a fixed rate basis, or an hourly rate basis.

The information of the transmission billing method indicates how to collect a bill for the information processing terminal.

The information of the current position indicates information acquired by a GPS or the like. The information of the current position is used for delivery of CM or selection of services to be provided.

The information of the CM playback history indicates information on billing or addition of points based upon viewing/listening CMs played on the information processing terminal.

The preference information indicates information registered for the information processing terminal or information extracted from the user's past purchase history or the user's past search history. The preference information is used for delivery of advertisement or recommendation of contents.

With such a configuration, the content delivery system according to this embodiment manages the master IDs and the slave IDs in association with each other, so that the usability can be improved.

Furthermore, contents being played can be transferred between information processing terminals used by a user. Additionally, when additional information is transferred, contents can be converted into a format suitable for each information processing terminal.

Figure 7:
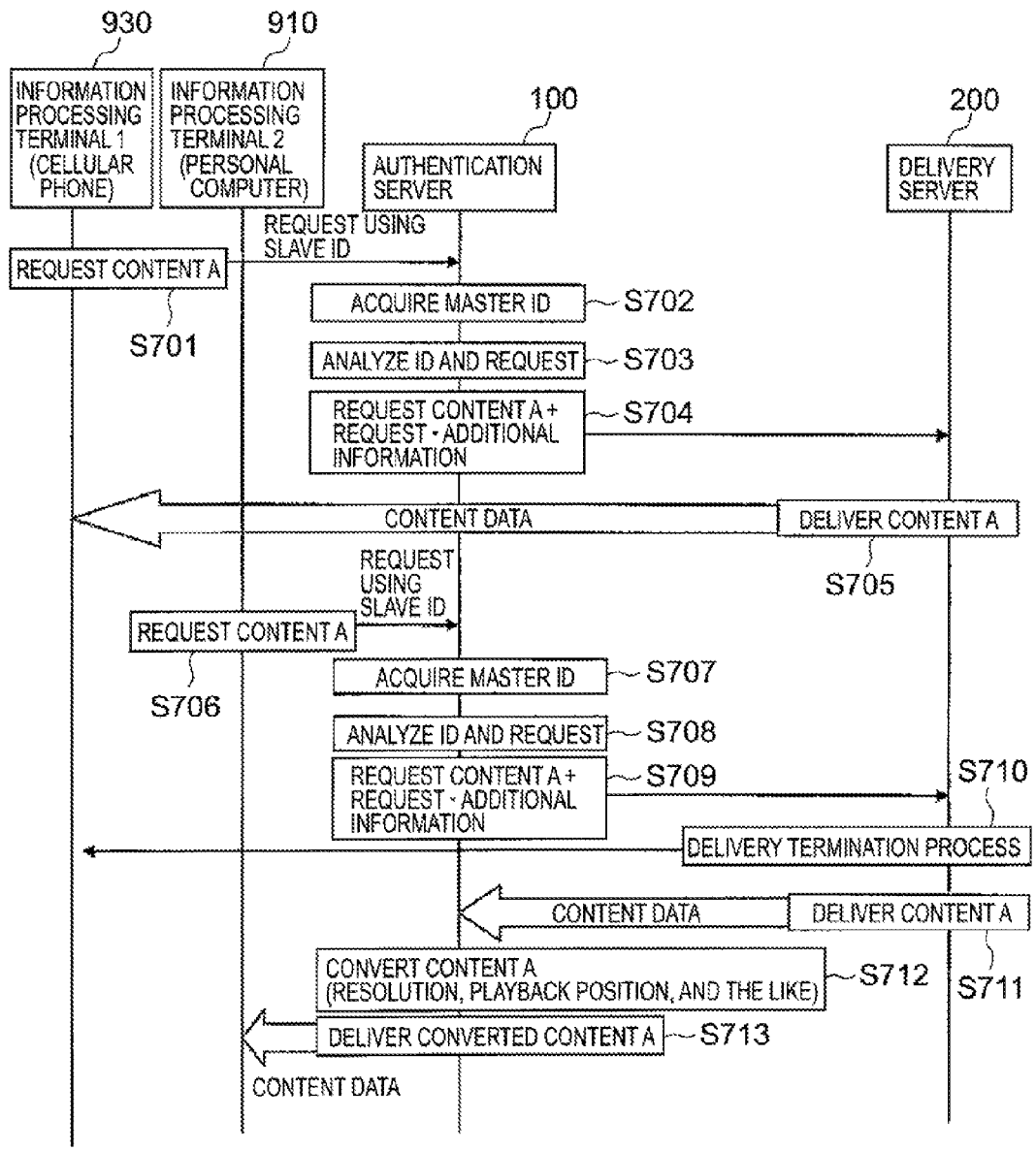
FIG. 7 is a sequence diagram showing an operation example of the content delivery system.

FIG. 7 is a sequence diagram showing an operation example of the content delivery system according to the first embodiment. The flow shows a seamless operation in which a user who uses a cellular phone 930 as an information processing terminal 1 and a personal computer 910 as an information processing terminal 2 views or listens to content A on the cellular phone 930 and then views or listens to the content A on the personal computer 910 at home or the like. Specifically, there is shown an operation of taking over content from a mobile information processing terminal to a fixed information processing terminal. This operation is one of examples of operations implemented by the aforementioned individual information, additional information, and the like. The operation may vary depending upon the user's contract, the information processing terminal being used, and the like. Processes of each information processing device are performed by a control unit of the information processing device. For the sake of brevity, however, the description of the control unit is omitted herein, and those processes will be described as being performed by each information processing device.

The user of the content delivery system makes a delivery request of content A to the content delivery system with use of the cellular phone 930 and a portal. At that time, the cellular phone 930 uses the network connection part to access the authentication server 100 via the network 30 and transmit a slave ID and a viewing/listening request of the content A (Step S701).

The authentication server 100 receives the slave ID and the viewing/listening request of the content A that have been transmitted from the cellular phone 930 via the network 30. Based upon the slave ID, the authentication server 100 acquires a master ID with reference to the ID management information 113 (Step S702).

The authentication server 100 acquires information of the master ID and the slave ID from the master ID information 111 and the slave ID information 112. Furthermore, the authentication server 100 analyzes the viewing/listening request of the content A (Step S703).

The authentication server 100 generates additional information by using the analysis results and transmits the authentication results of the user, the information relating to the request, and the additional information to the delivery server 200 (Step S704).

Here, the additional information is information that is to be transmitted to the delivery server 200 and used for content delivery based on the individual information of the master ID and the slave ID included in the ID management information 113. For example, the additional information refers to the authentication class, the viewing/listening status, and the device (see FIG. 5), and/or refers to the authentication device class, the device capability, and the transmission capability (see FIG. 6), and includes information to notify the delivery server 200 of the resolution, the compression ratio, and the transmission speed (QoS) control or the like that are suitable for an information processing terminal that has requested the content, information for transmitting the license information, the billing information, or the like to a user via the delivery server 200, information for identifying the type of DRM or an encryption key, and the like. Specifically, the additional information is information to be transmitted when the authentication server 100 requests contents from the delivery server 200 and information to specify and control the operation of the delivery server 200.

The delivery server 200 receives the information relating to the content delivery that has been transmitted from the authentication server 100. Based on the received information, the delivery server 200 delivers the content A to the cellular phone 930. Specifically, the delivery server 200 permits the cellular phone 930 to access the content A stored in the delivery server 200. Alternatively, the delivery server 200 accesses the cellular phone 930 and transmits the content A to the cellular phone 930 (Step S705).

Thus, the cellular phone 930 of the information processing terminal 1 uses the slave ID so that the content A can be viewed or listened to. The delivered content A can be viewed or listened to by using storage means (storage unit or storage area) of the cellular phone 930.

Next, there will be illustrated a seamless operation in which the user of the content delivery system views or listens to the content A on the personal computer 910 that are being viewed or listened to on the cellular phone 930.

The user of the content delivery system transmits a delivery request of the content A to the content delivery system with use of the personal computer 910. The user's preference, such as selection of playing back the content A at an arbitrary position (the current viewing/listening position), or selection of playing back the content A from the beginning, or changes of the billing method or the resolution, can be set through the operation of the personal computer. At that time, the personal computer 910 accesses the authentication server 100 via the network 30 and transmits a slave ID, a viewing/listening request of the content A, and information supplementary to the viewing/listening request (Step S706).

The authentication server 100 receives the slave ID, the viewing/listening request of the content A, and the information supplementary to the viewing/listening request that have been transmitted from the personal computer 910 via the network 30. Based on the slave ID, the authentication server 100 acquires a master ID with reference to the ID management information 113 (Step S707).

The authentication server 100 acquires information of the master ID and the slave ID from the master ID information 111 and the slave ID information 112. Furthermore, the authentication server 100 analyzes the viewing/listening request of the content A and the information supplementary to the viewing/listening request (Step S708).

The authentication server 100 generates additional information by using the analysis results and transmits the authentication results of the user, the information relating to the request, and the additional information to the delivery server 200 (Step S709).

Here, the additional information includes information for stopping the content A being delivered to the cellular phone 930 and performing a process of delivering the content A to the personal computer 910, information indicative of resolution change, additional fees, or DRM change, which are generated depending upon the license status of the content A, information indicative of the delivery target of the contents, and the like. By generating such additional information, the viewing/listening position of the contents, the past CM playback history, and the like can be inherited between information processing terminals. Therefore, the usability can be improved, and a seamless service can be provided.

The delivery server 200 receives the information relating to the content delivery that has been transmitted from the authentication server 100. Based on the received information, the delivery server 200 performs a termination process of the content A being delivered to the cellular phone 930 (Step S710).

The delivery server 200 transmits the content A to the authentication server 100 (Step S711). The content A are transmitted to the authentication server 100 because the authentication server 100 converts the resolution of the content A, converts the DRM of the content A, adjusts the playback position of the content A, and then delivers the content A to the personal computer 910. In other words, if no adjustment is required, the content A may be delivered directly to the personal computer 910. In a case where a proxy server or the like is used, the proxy server may perform the adjustment (convert). The delivery target is determined by the individual information stored in association with the ID and/or by the status of the content delivery system.

The authentication server 100 receives the content A, converts the resolution, converts the DRM, and sets the playback position (Step S712).

The authentication server 100 delivers the content A to the personal computer 910 (Step S713).

Thus, the personal computer 910 of the information processing terminal 2 allows the content A to be delivered with use of the slave ID. At that time, the content A can be delivered in a resolution suitable for the personal computer 910.

Furthermore, the playback position of the content A and the like can be inherited, namely a seamless service can be provided. The delivered content A can be viewed or listened to by using storage means (storage unit or storage area) of the personal computer 910.

A second embodiment of the present invention will be described with reference to FIG. 8. The second embodiment differs from the first embodiment in that, while the authentication server 100 does not convert the resolution and/or the DRM, a conversion server 300 performs a variety of conversion processes and the like. The conversion server 300 is formed by a general server. The conversion server 300 operates by various programs that control a control unit so as to function as various conversion means. Specifically, the contents to be viewed or listened to are converted by the conversion server 300 and then provided to the information processing terminal. The configuration other than the conversion server 300 is substantially the same as that of the first embodiment. Therefore, the detailed explanation is omitted herein.

Figure 8:
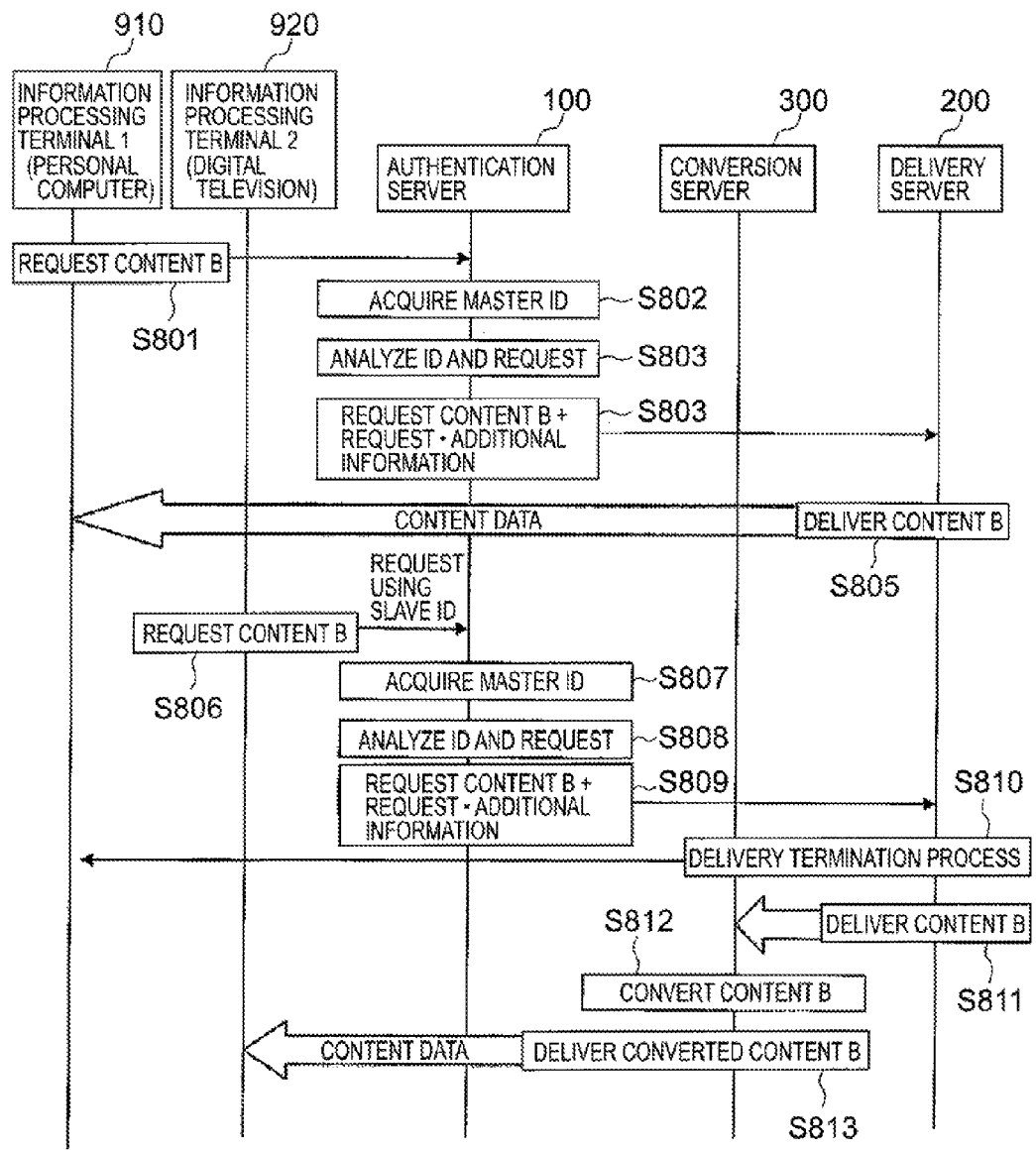
FIG. 8 is a sequence diagram showing an operation example of a content delivery system according to a second embodiment.

FIG. 8 is a sequence diagram showing an operation example of the content delivery system according to the second embodiment.

The flow shows a seamless operation in which a user who uses a personal computer 910 as an information processing terminal 1 and a digital television 920 as an information processing terminal 2 views or listens to content B on the personal computer 910, pauses the content B in the middle of the playback, and then plays back the content B from the paused position on the digital television 920 located at another room.

The digital television 920 plays back the contents in an encoding format different than that of the personal computer 910 and by a streaming scheme. Furthermore, the digital television 920 can play back the contents in a higher resolution as compared to the personal computer. Thus, the digital television 920 needs a more broadband for content playback. For the sake of brevity, processes performed by a control unit of each information processing device will be described as being performed by each information processing device.

The user of the content delivery system transmits a delivery request of the content B to the content delivery system with use of the personal computer 910. At that time, the personal computer 910 uses the network connection part to access the authentication server 100 via the network 30 and transmit a slave ID and a viewing/listening request of the content B (Step S801).

The authentication server 100 receives the slave ID and the viewing/listening request of the content B that have been transmitted from the personal computer 910 via the network 30. Based upon the slave ID, the authentication server 100 acquires a master ID with reference to the ID management information 113 (Step S802).

The authentication server 100 acquires information of the master ID and the slave ID from the master ID information 111 and the slave ID information 112. Furthermore, the authentication server 100 analyzes the viewing/listening request of the content B (Step S803).

The authentication server 100 generates additional information by using the analysis results and transmits the authentication results of the user, the information relating to the request, and the additional information to the delivery server 200 (Step S804).

The delivery server 200 receives the information relating to the content delivery that has been transmitted from the authentication server 100. Based on the received information, the delivery server 200 delivers the content B to the personal computer 910 (Step S805).

Next, there will be illustrated a seamless operation in which the user of the content delivery system stops the viewing/listening on the personal computer 910 and then views or listens to the content B on the digital television 920.

The user of the content delivery system uses the personal computer 910 to perform a stopping process of the content B for the content delivery system. The user operates the digital television 920 to make a delivery request from the digital television 920. At that time, the digital television 920 accesses the authentication server 100 via the network 30 and transmits a slave ID, a viewing/listening request of the content B, and information supplementary to the viewing/listening request (Step S806).

The authentication server 100 receives the slave ID, the viewing/listening request of the content B, and the information supplementary to the viewing/listening request that have been transmitted from the digital television 920 via the network 30. Based on the slave ID, the authentication server 100 acquires a master ID with reference to the ID management information 113 (Step S807).

The authentication server 100 acquires information of the master ID and the slave ID from the master ID information 111 and the slave ID information 112. Furthermore, the authentication server 100 analyzes the viewing/listening request of the content B and the information supplementary to the viewing/listening request (Step S808).

The authentication server 100 generates additional information by using the analysis results and transmits the authentication results of the user, the information relating to the request, and the additional information to the delivery server 200 (Step S809).

Here, the additional information includes an acquisition request of the stopped position of the content B, information for delivering the content B to the digital television 920, information for confirming the license status of the content B, information for changing the encoding format and the resolution, information used for QoS control, and the like. By generating and transmitting such additional information, the viewing/listening position of the contents, the status of the authentication, the band width, the priority of packets, the class, the encoding format, and the like can be inherited between information processing terminals. Therefore, the usability can be improved, and a seamless service can be provided.

The delivery server 200 receives the information that has been transmitted from the authentication server 100. Based on the received information, the delivery server 200 performs a termination process of the delivery permission to the personal computer 910 (Step S810).

The delivery server 200 transmits the content B to the conversion server 300 (Step S811). The content B are transmitted to the conversion server 300 because the conversion server 300 converts the resolution of the content B, converts the encoding format of the content B, controls QoS, and then delivers the content B to the digital television 920.

The conversion server 300 receives the content B, converts the resolution, converts the encoding format and the like, and sets various parameters for QoS control (Step S812).

The conversion server 300 delivers the content B to the digital television 920 (Step S813).

Thus, the digital television 920 of the information processing terminal 2 uses the slave ID so that the content B can be viewed or listened to. At that time, the content B can be viewed or listened to in a suitable encoding format and transmission conditions.

A third embodiment of the present invention will be described with reference to FIGS. 9 and 10.

Figure 9:
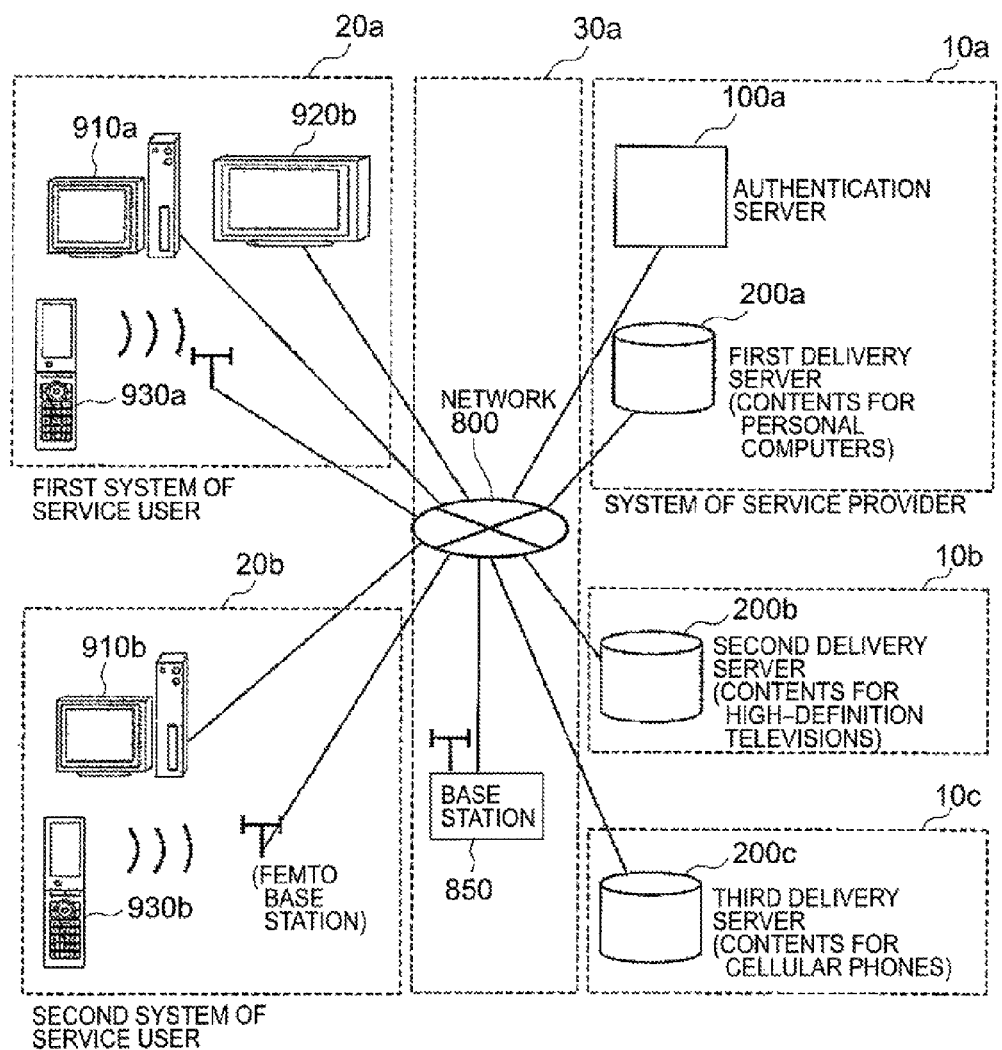
FIG. 9 is a diagram schematically showing a configuration example of a content delivery service according to a third embodiment.

FIG. 9 is a diagram schematically showing a configuration example of a content delivery service according to the third embodiment. The third embodiment differs from the first embodiment in that an authentication server 100a of the content delivery system manages a plurality of delivery servers 200a to 200c.

The delivery servers 200a to 200c are servers incorporated into separate delivery systems. The delivery servers 200a to 200c share the use of stored contents in accordance with agreements of the service providers or the like. For example, when a user of a content delivery service requests contents that are not held by that content delivery system but by another content delivery system, information on the billing process or the locations of the delivery servers is transmitted between those systems, so that the requested contents are delivered to the service user.

Figure 10:
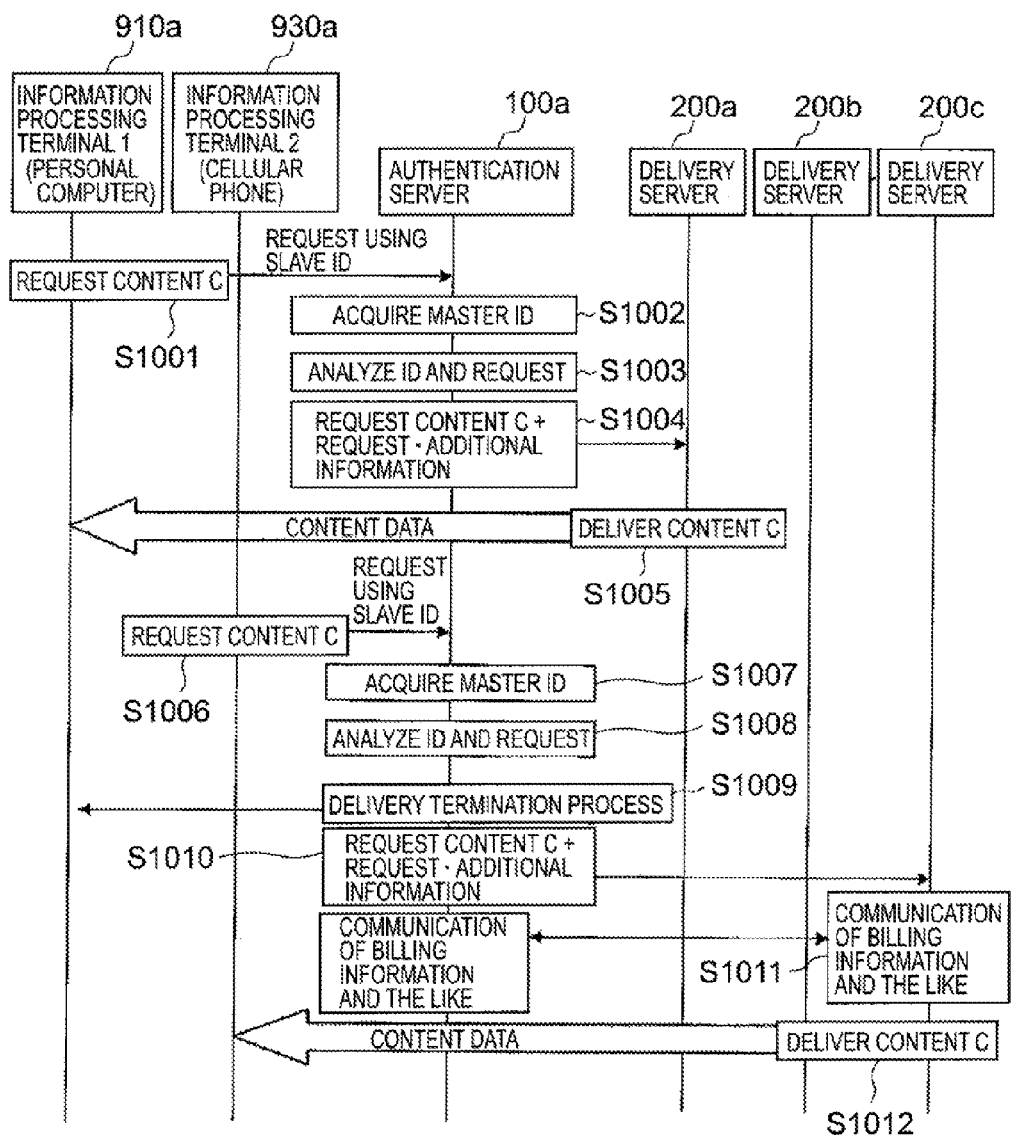
FIG. 10 is a sequence diagram showing an operation example of a content delivery system according to a third embodiment.

FIG. 10 is a sequence diagram showing an operation example of the content delivery system according to the third embodiment The flow shows a seamless operation in which a user who uses a personal computer 910a as an information processing terminal 1 and a cellular phone 930a as an information processing terminal 2 views or listens to content C on the personal computer 910a and then views or listens to the continuation of the content C on the cellular phone 930a as the user is going out. Processes of each information processing device are performed by a control unit of the information processing device. However, those processes will be described as being performed by each information processing device.

The user of the content delivery system transmits a delivery request of content C to the content delivery system with use of the personal computer 910a. At that time, the personal computer 910a uses the network connection part to access the authentication server 100a via the network 30a and transmit a slave ID and a viewing/listening request of the content C (Step S1001).

The authentication server 100a receives the slave ID and the viewing/listening request of the content C that have been transmitted from the personal computer 910a via the network 30a. Based upon the slave ID, the authentication server 100a acquires a master ID with reference to the ID management information 113 (Step S1002).

The authentication server 100a acquires information of the master ID and the slave ID from the master ID information 111 and the slave ID information 112. Furthermore, the authentication server 100a analyzes the viewing/listening request of the content C (Step S1003).

The authentication server 100a generates additional information by using the analysis results and transmits the authentication results of the user, the information relating to the request, and the additional information to the delivery server 200a (Step S1004).

The delivery server 200a receives the information relating to the content delivery that has been transmitted from the authentication server 100a. Based on the received information, the delivery server 200a delivers the content C to the personal computer 910a (Step S1005).

Next, there will be illustrated a seamless operation in which the user of the content delivery system stops the viewing/listening on the personal computer 910a and then views or listens to the content C on the cellular phone 930a.

The user of the content delivery system uses the personal computer 910a to perform a stopping process of the content C for the content delivery system. The user operates the cellular phone 930a to transmit a delivery request from the cellular phone 930a. At that time, the cellular phone 930a accesses the authentication server 100a via the network 30a and transmits a slave ID, a viewing/listening request of the content B, and information supplementary to the viewing/listening request (Step S1006).

The authentication server 100a receives the slave ID, the viewing/listening request of the content C, and the information supplementary to the viewing/listening request that have been transmitted from the cellular phone 930a via the network 30a. Based on the slave ID, the authentication server 100a acquires a master ID with reference to the ID management information 113 (Step S1007).

The authentication server 100a acquires information of the master ID and the slave ID from the master ID information 111 and the slave ID information 112. Furthermore, the authentication server 100a analyzes the viewing/listening request of the content C and the information supplementary to the viewing/listening request. From the analysis results, the authentication server 100a determines that the delivery server 200a managed by the authentication server 100a does not have the content C that correspond to the cellular phone 930a as the user requested and determines that the delivery server 200c has the content C that correspond to the cellular phone 930a (Step S1008).

The authentication server 100a performs a viewing/listening termination process of the content C to the personal computer 910a (Step S1009).

The authentication server 100a generates additional information by using the analysis results and transmits the authentication results of the user, the billing information, the CM viewing/listening history, information relating to the request, and the additional information to the delivery server 200c (Step S1010).

The delivery server 200c communicates with the authentication server 200a and takes over the billing information, the CM information to be delivered along with the content C, and the like (Step S1011). The user can access the delivery server 200c via the authentication server 100a without any contract or authentication process.

Based on the information relating to the content delivery transmitted from the authentication server 100a, the delivery server 200c delivers the content C to the cellular phone 930a (Step S1012).

Thus, collective management of the master IDs and the slave IDs in association with each other allows effective use of contents stored in a plurality of delivery servers.

Furthermore, transfer of the billing information and the CM viewing/listening history allows effective use of contents held by another service provider and proper use of contents.

Moreover, use of a trusted authentication server can simplify an authentication process and improve the usability.

Next, there will be described an example in which the present invention is implemented with an ISM network. The first embodiment is embodied in this example. The same terms are used for the same parts, and the explanation thereof is omitted herein. Furthermore, this example uses the terms as used in TISPAN (Telecommunications and Internet converged Services and Protocols for Advanced Networking) of ETSI (European Telecommunications Standards Institute).

Figure 11:
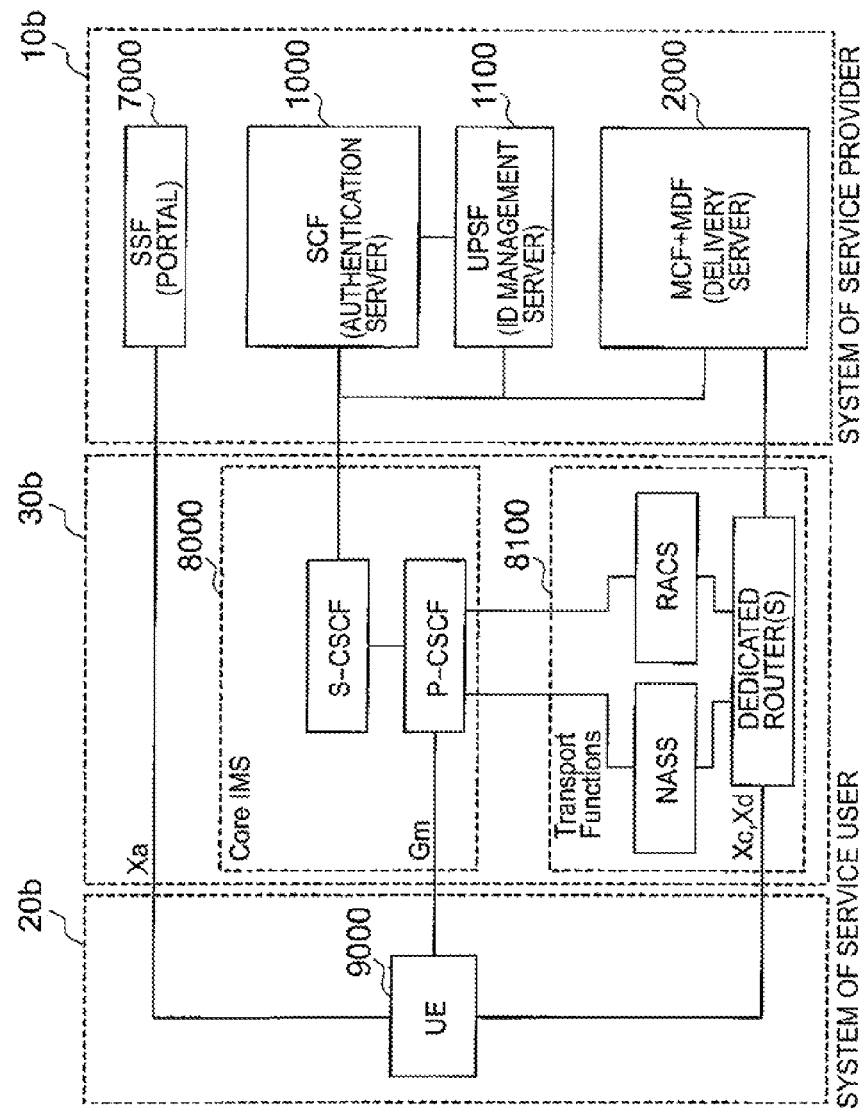
FIG. 11 is a diagram schematically showing a configuration of a content delivery service according to a first example.

FIG. 11 is a diagram schematically showing a configuration of a content delivery service according to a first example. As shown in FIG. 11, the content delivery service of this example can be divided into a system of a service provider 10*b*, a system of a service user 20*b*, and a network 30*b* for connecting those systems to each other. The abbreviations used in FIG. 11 are listed below.

UE: User Equipment
S-CSCF: Serving Call Session Control Function
P-CSCF: Proxy-Call Session Control Function
NASS: Network Attachment SubSystem
RACS: Resource and Admission Control Subsystem
SSF: Service Selection Function
SCF: Service Control Function
UPSF: User Profile Server Function
MCF: Media Control Function
MDF: Media Delivery Function The system of the service provider 10*b* is formed by an SSF 7000 as a portal, an SCF 1000 as an authentication server, a UPSF (ID management server) 1100 for managing user information (user IDs) and various kinds of ID information (device IDs or the like) in association with each other, and a delivery server 2000 (MCF 2100+MDF 2200) for storing various types of contents (content data) and delivering the contents upon request from the SCF 1000.

The system of the service user 20*b* is formed by a plurality of UEs 9000. In the system of the service user 20*b*, devices for network connection are provided as needed.

The network 30*b* is formed by a core IMS network 8000 for performing an authentication process and the like with use of SIP, and a TF (Transport Function) 8100 for communicating content data. The network 30*b* connects the system of the service provider 10*b* and the system of the service user 20*b* to each other and transmits contents and various kinds of information between those systems.

The SCF 1000 receives a request that has been transmitted from the UE 9000 via the network 30*b*. Based on information recorded and managed in the UPSF 1100, the SCF 1000 performs an authentication process of the request.

The master ID information, slave ID information, and ID management information, which have described with reference to FIGS. 4 to 6, are recorded and managed in the UPSF 1100.

The MCF 2100 controls the MDF 2200 based on information transmitted from the SCF 1000. Furthermore, the MCF communicates with the UE 9000 via the TF 8100 as needed and adjusts timing of starting playback of contents or the like.

The MDF 2200 stores therein contents, which is an aggregate of many contents. The MDF 2200 transmits specified content data to a UE or a specified device (server) in accordance with a delivery request of content data from the MCF 2100. Furthermore, the MDF 2100 has a conversion function and an adjustment function of contents, which are provided by the authentication server 100 in the first embodiment.

The UE 9000 is an information processing terminal for enjoying the service. The UE 9000 communicates in accordance with protocols such as SIP, HTTP, HTTPS, RTP, and RTSP as needed. The UE 9000 performs a playback process on content data being transmitted from the MDF.

The core IMS network 8000 is formed by an S-CSCF, a P-CSCF (an 1-CSCF as needed), and the like. The core IMS network 8000 uses SIP as a basic protocol and controls sessions.

The TF 8100 is formed by a TCF (Transport Control Function) and a TPF (Transport Processing Function). In an embodied case, the TF 8100 is formed by NASS (Network Attachment SubSystem), an RACS (Resource and Admission Control Subsystem), dedicated routers, or the like.

The content delivery system having the above configuration in this example manages the master IDs and the slave IDs in association with each other using the UPSF and the SCF, so that the usability can be improved. Furthermore, inherit of information supplementary to contents or the like can be managed between UEs used by a user. Moreover, when additional information is transferred, contents can be converted into a format suitable for each UE.

Figure 12:
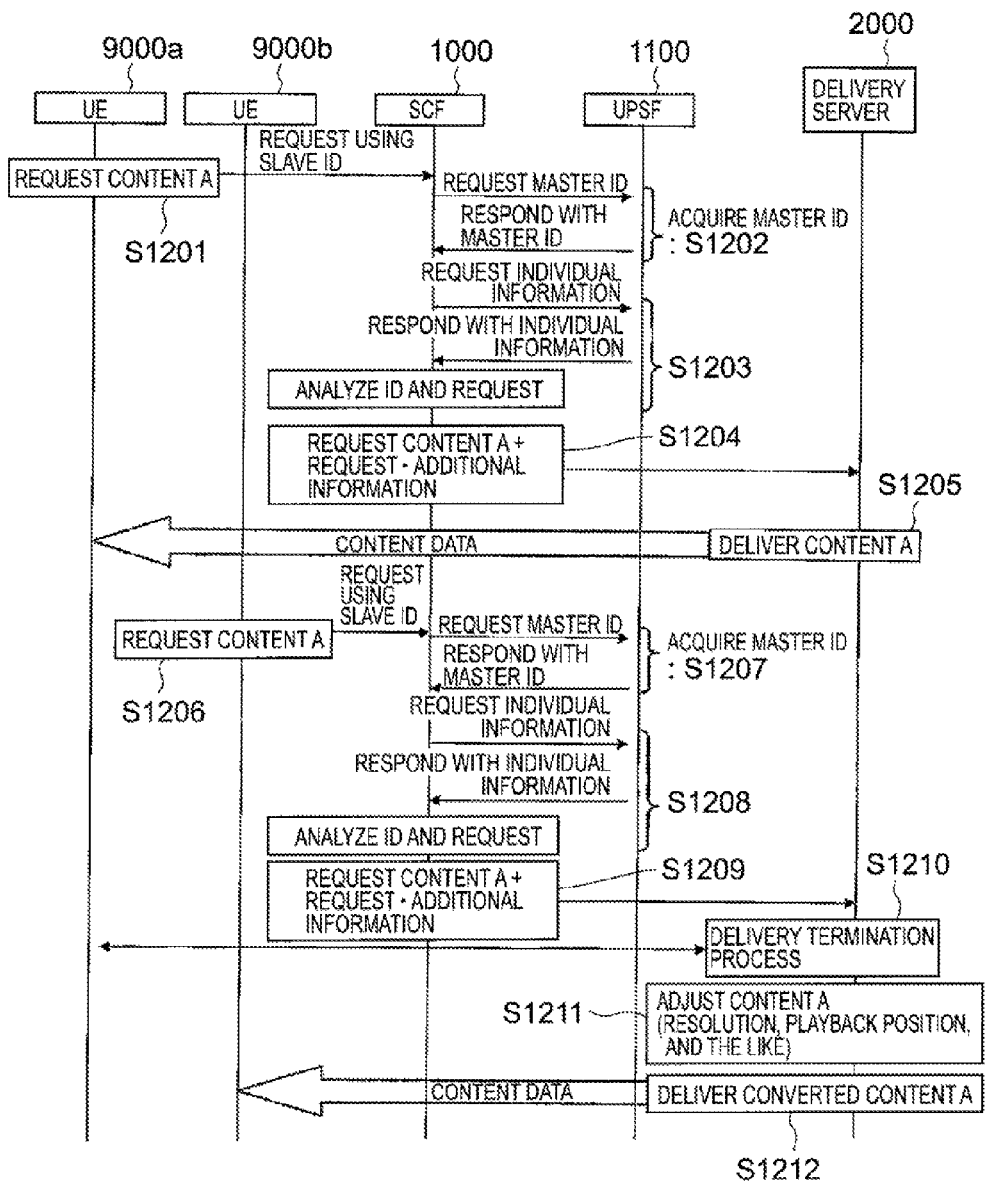
FIG. 12 is a sequence diagram showing operation of the content delivery system of the example.

FIG. 12 is a sequence diagram showing operation of the content delivery system of this example. The flow shows a seamless operation in which a user who uses a UE 9000*a* and a UE 9000*b* views or listens to content A on the UE 9000*a* and then views or listens to the content A on the UE 9000*b*. In other words, the flow shows an operation of take over content between the UEs.

The user of the content delivery system transmits a delivery request of content A to the content delivery system with use of the UE 9000*a* or a portal. At that time, the UE 9000*a* communicates with the SSF 7000 via the Xa interface, acquires a content list and the like, and presents the content list and the like to the user. Then the UE 9000*a* accesses the SCF 1000 via the Gm interface based on the user's selection and transmits a slave ID and a viewing/listening request of the content A to the SCF 1000 (Step S1201).

The SCF 1000 receives the slave ID and the viewing/listening request of the content A from the UE 9000*a*. Based on the slave ID, the SCF 1000 requests a master ID to the UPSF 1100. The UPSF 1100 acquires a master ID with reference to the ID management information 113 and responds to the SCF 1000 (Step S1202).

The SCF 1000 requests information of the master ID and the slave ID to the UPSF 1100. The UPSF 1100 acquires requested information from the stored master ID information 111 and slave ID information 112 and responds to the SCF 1000. The SCF 1000 analyzes the acquired information and the viewing/listening request of the content A (Step S1203).

The SCF 1000 generates additional information by using the analysis results and transmits the authentication results of the user, the information relating to the request, and the additional information to the delivery server 2000 (MCF 2100) (Step S1204).

The delivery server 2000 receives the information relating to the content delivery that has been transmitted from the SCF 1000. Based on the received information, the delivery server 2000 delivers the content A to the UE 9000*a*. Specifically, the MCF 2100 receives the information relating to the content delivery that has been transmitted from the SCF 1000. The MCF 2100 transmits conditions relating to the UE 9000*a* and the delivery as needed and notifies the MDF 2200 of a delivery request of the content A. The MDF 2200 transmits data of the content A to the UE 9000*a* in accordance with control of the MCF 2100 (Step S1205).

Thus, the UE 9000*a* uses the slave ID so that the content A can be viewed or listened to.

Next, there will be illustrated a seamless operation in which the user of the content delivery system views or listens to the content A on the UE 9000*b* that are being viewed or listened to on the UE 9000*a*.

The user of the content delivery system transmits a delivery request of the content A to the content delivery system with use of the UE 9000*b*. At that time, the UE 9000*b* accesses the SCF 1000 via the Gm interface and transmits a slave ID, a viewing/listening request of the content A, and information supplementary to the viewing/listening request to the SCF 1000 (Step S1206).

The SCF 1000 receives the slave ID and the viewing/listening request of the content A from the UE 9000*b*. Based on the slave ID, the SCF 1000 requests a master ID to the UPSF 1100. The UPSF 1100 acquires a master ID with reference to the ID management information 113 and responds to the SCF 1000 (Step S1207).

The SCF 1000 requests information of the master ID and the slave ID to the UPSF 1100. The UPSF 1100 acquires requested information from the stored master ID information 111 and slave ID information 112 and responds to the SCF 1000. The SCF 1000 analyzes the acquired information and the viewing/listening request of the content A (Step S1208).

The SCF 1000 generates additional information by using the analysis results and transmits the authentication results of the user, the information relating to the request, and the additional information to the delivery server 2000 (Step S1209).

Here, the additional information includes information for stopping the content A being delivered to the UE 9000a and performing a process of delivering the content A to the UE 9000b, information indicative of resolution covert, additional fees, DRM covert (change), which are generated depending upon the license status of the content A, information indicative of the delivery target of the contents and the like. By generating such additional information, the viewing/listening position of the contents, the past CM playback history, and the like can be take over between UEs. Therefore, the usability can be improved, and a seamless service can be provided.

The delivery server 2000 receives the information relating to the content delivery that has been transmitted from the SCF 1000. Based on the received information, the delivery server 200 performs a termination process of the content A being delivered to the UE 9000a (Step S1210).

The delivery server 2000 uses the functions of the MDF 2200 to adjust (convert or change) the content A as needed (Step S1211). For example, this adjustment includes adjustment of the content A for fitting to the UE 9000b and adjustment for proper use of the copyrights.

The delivery server 2000 delivers the content A to the UE 9000b (Step S1213).

Thus, the UE 9000b uses the slave ID so that the content A can be delivered. At that time, the content A suitable for the UE 9000b can be delivered. Furthermore, the playback position of the content A and the like can be inherited, namely a seamless service can be provided.

Next, a second example will be described. The second embodiment is embodied in the second example. Specifically, a conversion server 3000 is added to the first example, and conversion or adjustment of contents, which has been performed by the MDF 2200, is transferred to the conversion server 3000. The same terms are used for the same parts as in the second embodiment and the first example, and the explanation thereof is omitted herein. Since the arrangement other than the conversion server 3000 is almost the same as that of the first example, the detailed explanation of the arrangement is omitted herein.

Figure 13:
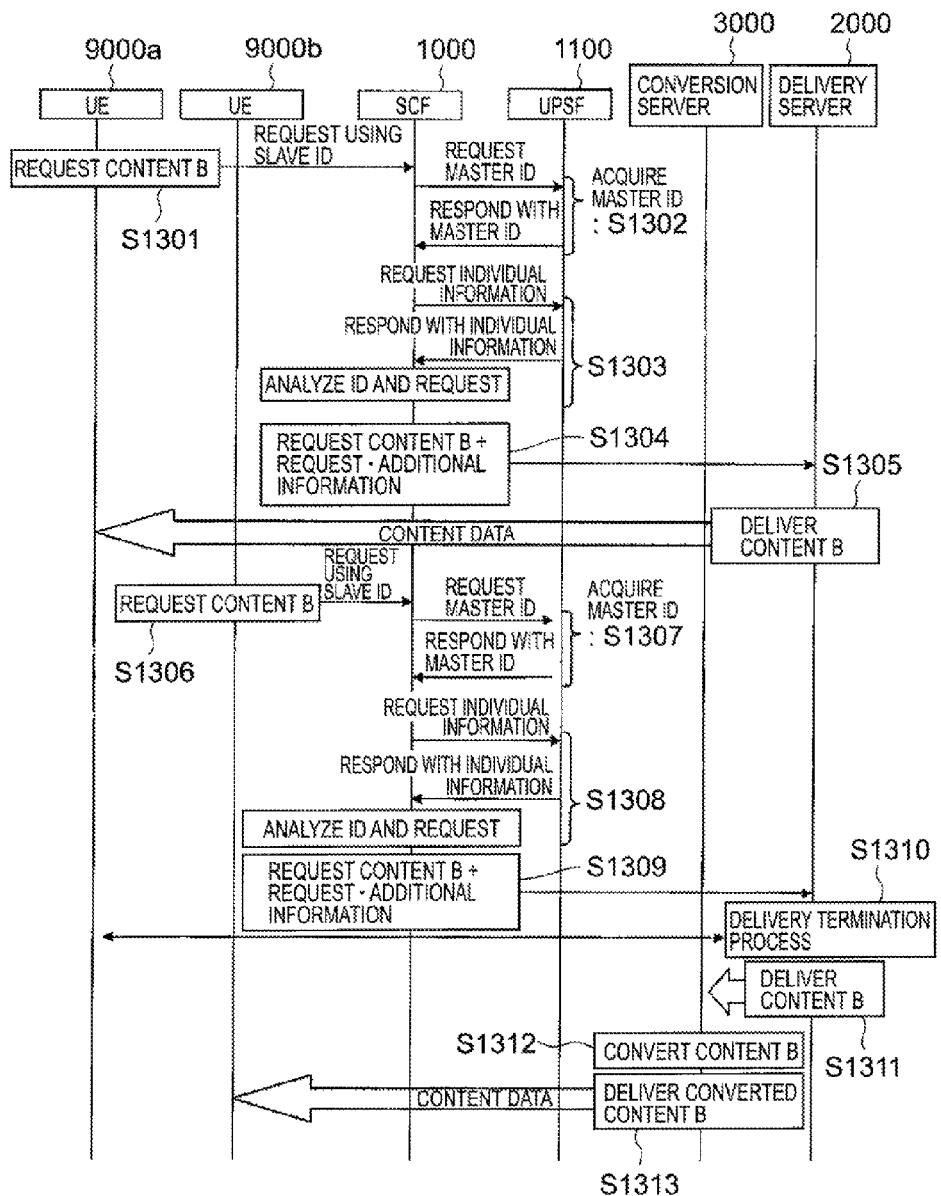
FIG. 13 is a sequence diagram showing operation of a content delivery system of a second example.

FIG. 13 is a sequence diagram showing operation of the content delivery system of the second example. The flow shows a seamless operation in which a user who uses a UE 9000a and a UE 9000b in which playable DRMs are different views or listens to content B on the UE 9000a, pauses the content B in the middle of the playback, and then plays back the content B from the stopped position on the UE 9000b.

The user of the content delivery system transmits a delivery request of content B to the content delivery system with use of the UE 9000a and a portal. At that time, the UE 9000a accesses the SCF 1000 based on the user's selection and transmits a slave ID and a viewing/listening request of the content B to the SCF 1000 (Step S1301).

The SCF 1000 receives the slave ID and the viewing/listening request of the content B from the UE 9000a. Based on the slave ID, the SCF 1000 requests a master ID to the UPSF 1100. The UPSF 1100 acquires a master ID with reference to the ID management information 113 and responds to the SCF 1000 (Step S1302).

The SCF 1000 requests information of the master ID and the slave ID to the UPSF 1100. The UPSF 1100 acquires requested information from the stored master ID information 111 and slave ID information 112 and responds to the SCF 1000. The SCF 1000 analyzes the acquired information and the viewing/listening request of the content B (Step S1303).

The SCF 1000 generates additional information by using the analysis results and transmits the authentication results of the user, the information relating to the request, and the additional information to the delivery server 2000 (MCF 2100) (Step S1304).

The delivery server 2000 receives the information relating to the content delivery that has been transmitted from the SCF 1000. Based on the received information, the delivery server 2000 delivers the content B to the UE 9000a (Step S1305).

Next, there will be illustrated a seamless operation in which the user of the content delivery system views or listens to the content B from the stopped position on the UE 9000b that have been paused on the UE 9000a.

The user transmits a delivery request of the content B to the content delivery system with use of the UE 9000b. At that time, the UE 9000b accesses the SCF 1000 and transmits a slave ID, a viewing/listening request of the content A, and information supplementary to the viewing/listening request to the SCF 1000 (Step S1306).

The SCF 1000 receives the slave ID and the viewing/listening request of the content B from the UE 9000b. Based on the slave ID, the SCF 1000 requests a master ID to the UPSF 1100. The UPSF 1100 acquires a master ID with reference to the ID management information 113 and responds to the SCF 1000 (Step S1307).

The SCF 1000 requests information of the master ID and the slave ID to the UPSF 1100. The UPSF 1100 acquires requested information from the stored master ID information 111 and slave ID information 112 and responds to the SCF 1000. The SCF 1000 analyzes the acquired information and the viewing/listening request of the content B (Step S1308).

The SCF 1000 generates additional information by using the analysis results and transmits the authentication results of the user, the information relating to the request, and the additional information to the delivery server 2000 (Step S1309).

Here, the additional information includes information for stopping the content B being delivered to the UE 9000a and performing a process of delivering the content B to the UE 9000b, information indicative of resolution convert, additional fees, or DRM convert, which are generated depending upon the license status of the content B, information indicative of the delivery target of the contents, and the like. By generating such additional information, the viewing/listening position of the contents, the past CM playback history, and the like can be inherited between UEs. Therefore, the usability can be improved, and a seamless service can be provided.

The delivery server 2000 receives the information relating to the content delivery that has been transmitted from the SCF 1000. Based on the received information, the delivery server 200 performs a termination process of the content B being paused on the UE 9000a (Step S1310).

The delivery server 2000 transmits the content B to the conversion server 3000 (Step S1311). The content B are transmitted to the conversion server 3000 because the conversion server 3000 converts the DRM scheme of the content B into a format supported by the UE 9000b. Adjustments of the resolution, QoS, and the like may be performed in addition to conversion of the DRM.

The conversion server 3000 receives the content B, converts the DRM, namely converts the content B (Step S1312).

The conversion server 3000 delivers the content B to the UE 9000b (Step S713).

Thus, the UE 9000b uses the slave ID so that the content B can be played back. The content B can be viewed or listened to with a suitable DRM. In other words, without thought of the difference of DRMs supported by the UE 9000a and the UE 9000b, the user of the UE 9000a can restart viewing or listening of the contents on the UE 9000b from a position at which the contents have been paused on the UE 9000a.

The aforementioned examples have been described using the terms used in TISPAN. Those examples can also be described with the terms defined by I-TUT. Specifically, the functions of the SCF may be transferred to AS and/or S-CSCF, and the functions of the UPSF may be implemented by using HSS, SLF, or the like. Furthermore, the conversion server and the delivery server correspond to AS.

The present invention is not limited to the aforementioned embodiments and examples. With respect to configuration or operation of the present invention, various modifications that would be apparent to those skilled in the art may be made within the scope of the claims of the present invention.

This application is the National Phase of PCT/JP2008/069076, filed Oct. 15, 2008, which claims the benefit of priority from Japanese patent application No. 2007-280265, filed on Oct. 29, 2007, the disclosure of which is incorporated herein in its entirety by reference.

The invention claimed is:

1. An authentication server used in a content delivery system to deliver contents via a network to a plurality of an information processing terminals which are used by a single service user and which individually play back the contents, the content delivery system including a delivery server and the authentication server, the authentication server comprising:
a memory and a processor;
a control unit configured to:
manage unique information of each of the information processing terminals as the device authentication IDs and information relating to the single service user as a user authentication ID, and which collectively manages, ID management information representative of a relationship between the device authentication IDs and the user authentication ID;
respond to a content delivery request issued by the use of each device authentication ID from each of the processing information processing terminals;
acquire the user authentication ID collectively managed with each of the device authentication IDs with reference to the ID management information;
perform an authentication relating to the content delivery request by the use of the user authentication ID and device identification IDs to determine whether or not the contents are delivered to each of the information processing terminals and to determine whether or not the contents are taken over from one of the information processing terminals to another one with reference to the additional information; and
generates the additional information needed for taking over the contents between the plurality of the information processing terminals, the additional information being transmitted to the delivery server along with an authentication result and being used to continuously deliver the contents to the single service user even when the information processing terminals of the single service user are changed from one to another.

2. The authentication server as recited in claim 1, further comprising:
a memory device which stores individual information included in the respective device authentication IDs and the user authentication ID;
wherein:
the control unit generates the additional information with reference to the individual information along with each device authentication ID and the user authentication ID.

3. A content delivery system for delivering contents via a network to a plurality of information processing terminals which are used by a ~service user and which can individually play back the contents, the content delivery system having an authentication unit for authenticating a user and a delivery unit for delivering contents, the content delivery system comprising:
a memory and a processor;
a control unit configured to manage, as a device authentication IDs, unique information of information processing terminals used by the single service user;
manage information relating to the single service user as a user authentication ID; and
collectively manage ID management information representative of a relationship between each of the device authentication IDs and the user authentication ID;
wherein:
the control unit responds to a content delivery request using each device authentication ID given from each information processing terminal to acquire the user authentication ID collectively managed with the device authentication ID with reference to the ID management information, and to authenticate the content delivery request by the use of the user authentication ID and device identification IDs to determine whether or not the contents are delivered to each of the information processing terminals and to determine whether or not the contents are taken over from one of the information processing terminals to another one with reference to the additional information;
the control unit further generating additional information which is needed for taking over the contents between the plurality of the information processing terminals, the additional information being transmitted to the delivery server along with an authentication result;
wherein:
the delivering unit continuously delivers, in response to the additional information and the authentication result, requested contents to the single service user even when the information processing terminals of the single service user are changed from one to another.

4. The content delivery system as recited in claim 3 comprising:
a memory device stores individual information in association with each device authentication ID and the user authentication ID;
a control unit which generates additional information indicative of an additional condition relating to content delivery with reference to the individual information along with each device authentication ID and the user authentication ID;
wherein:
the delivery unit delivers the requested contents based on the additional information.

5. The content delivery system as recited in claim 3, wherein:
the control unit acquires a using status of the user authentication ID, and generates the additional information based on the using status when the content delivery request from the information processing terminal used by the service user is authenticated.

6. The content delivery system as recited in claim 3, wherein:
the additional information includes information indicative of a playback resolution of the user's information processing terminal that has requested content, and a resolution of content to be delivered is set based on that information.

7. The content delivery system as recited in claim 3, wherein:
the additional information includes information indicative of a status of an authentication of the user's information processing terminal that has requested content, and the authentication is simplified based on that information.

8. The content delivery system as recited in claim 3, wherein:
the additional information includes information indicative of a delivery target of the user's information processing terminal that has requested content, and a delivery path of the contents is selected based on that information.

9. The content delivery system as recited in claim 3, wherein:
the additional information includes information relating to a DRM (Digital Rights Management) of the user's information processing terminal that has requested content, and a DRM to be set at delivery of the content is selected based on that information.

10. The content delivery system as recited in claim 3, wherein:
the additional information includes information relating to QoS (Quality of Service) control of the user's information processing terminal that has requested content, and a priority of packets and/or a class to be set at delivery of the content is selected based on that information.

11. The content delivery system as recited in claim 3, wherein:
the additional information indicative of the additional condition relating to content delivery-includes information relating to QoS control of the user's information processing terminal that has requested content, and a band width to be guaranteed at delivery of the content is set based on that information.

12. The content delivery system as recited in claim 3, wherein:
the additional information includes information indicative of an encoding format suitable for the user's information processing terminal that has requested content, and a delivery format at delivery of the content is set based on that information.

13. The content delivery system as recited in claim 3, wherein:
the additional information includes information indicative of a start position of playback of content, and a start position of playback of the content is set at delivery of the content based on that information.

14. The content delivery system as recited in claim 3, wherein:
the additional information includes information indicative of a CM viewing/listening history.

15. The content delivery system as recited in claim 3, wherein:
the additional information includes information indicative of a billing history.

16. A content delivery method of delivering contents to each of information processing terminals of a single service user by using a control unit which authenticates the single service user and a content delivery server which delivers content, the information processing terminals individually playing back the contents, comprising:
managing as a device authentication IDs, unique information of each of the information processing terminals used by the single service user;
managing as a user authentication ID, information relating to the single service user;
collectively managing ID management information representative of a relationship between each device authentication IDs and the user authentication ID;
responding to a content delivery request from each information processing terminal by the use of the device authentication ID, to acquire the user authentication ID collectively managed with each of the device authentication IDs with reference to the ID management information;
generating additional information which is needed for taking over the contents between the plurality of the information processing terminals, the additional information being transmitted to the delivery server along with an authentication result and being used to continuously deliver the contents to the single service user even when the information processing terminals of the single service user are changed from one to another; and
authenticating the content delivery request by the use of the user authentication ID and device identification IDs to determine whether or not the contents are delivered to each of the information processing terminals and to determine whether or not the contents are taken over from one of the information processing terminals to another one with reference to the additional information, by using the control unit; and
delivering requested contents in response to the authentication result, by using the delivery server.

17. The content delivery method as recited in claim 16 wherein:
the additional information indicative of an additional condition relating to content delivery is generated based on individual information recorded in association with the device IDs and the user authentication ID, and the delivery means delivers the requested content based on the additional information.

18. The content delivery method as recited in claim 16 wherein a using status of the user authentication ID is acquired when a content delivery request from the information processing terminal used by the service user is authenticated, and the additional information is generated based on the using status.

19. The content delivery method as recited in claim 16, wherein:
the additional information includes information relating to a DRM of the user's information processing terminal that has requested content and information indicative of a start position of playback of content, the delivery server delivering of the content adjusts based on that information.

* * * * *